2 Sheets—Sheet 1.
J. PURINTON, Jr.
MACHINE FOR LASTING BOOTS AND SHOES.
No. 25,673. Patented Oct. 4, 1859.
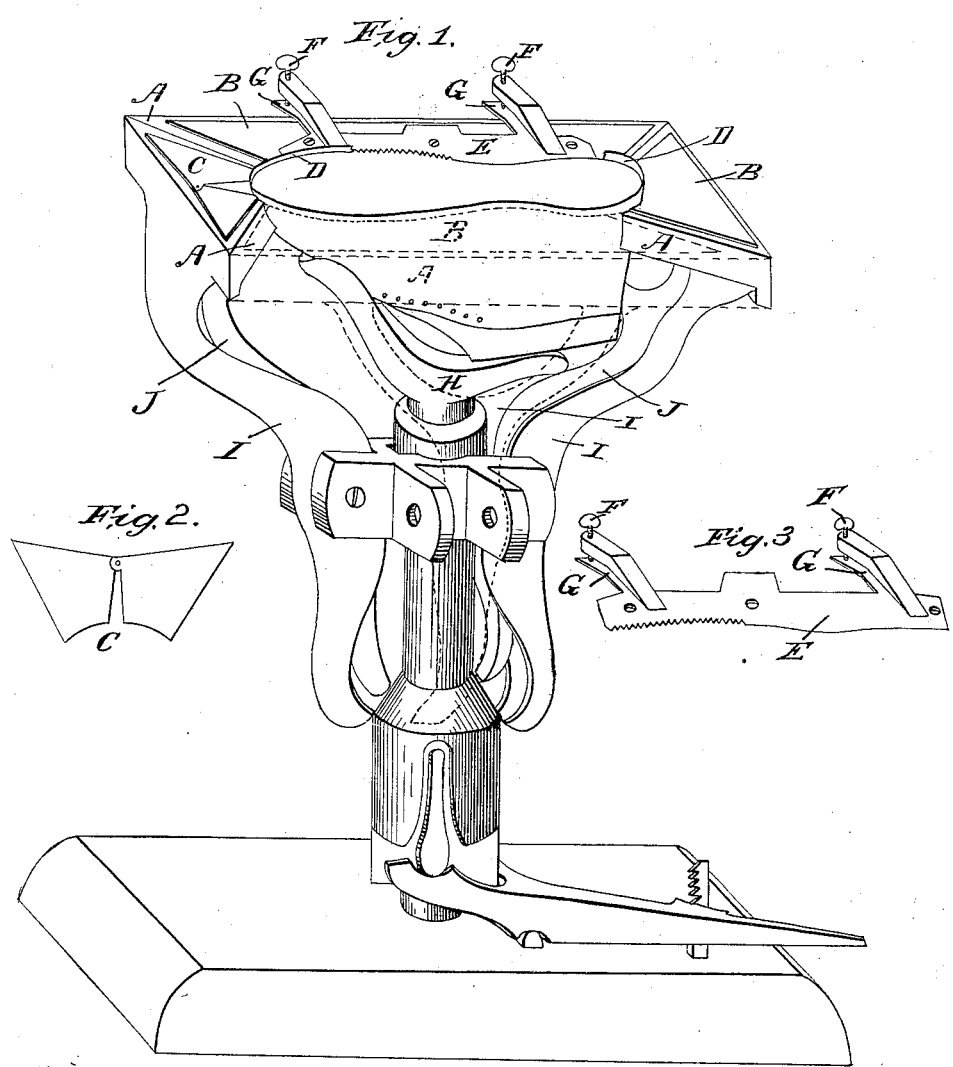

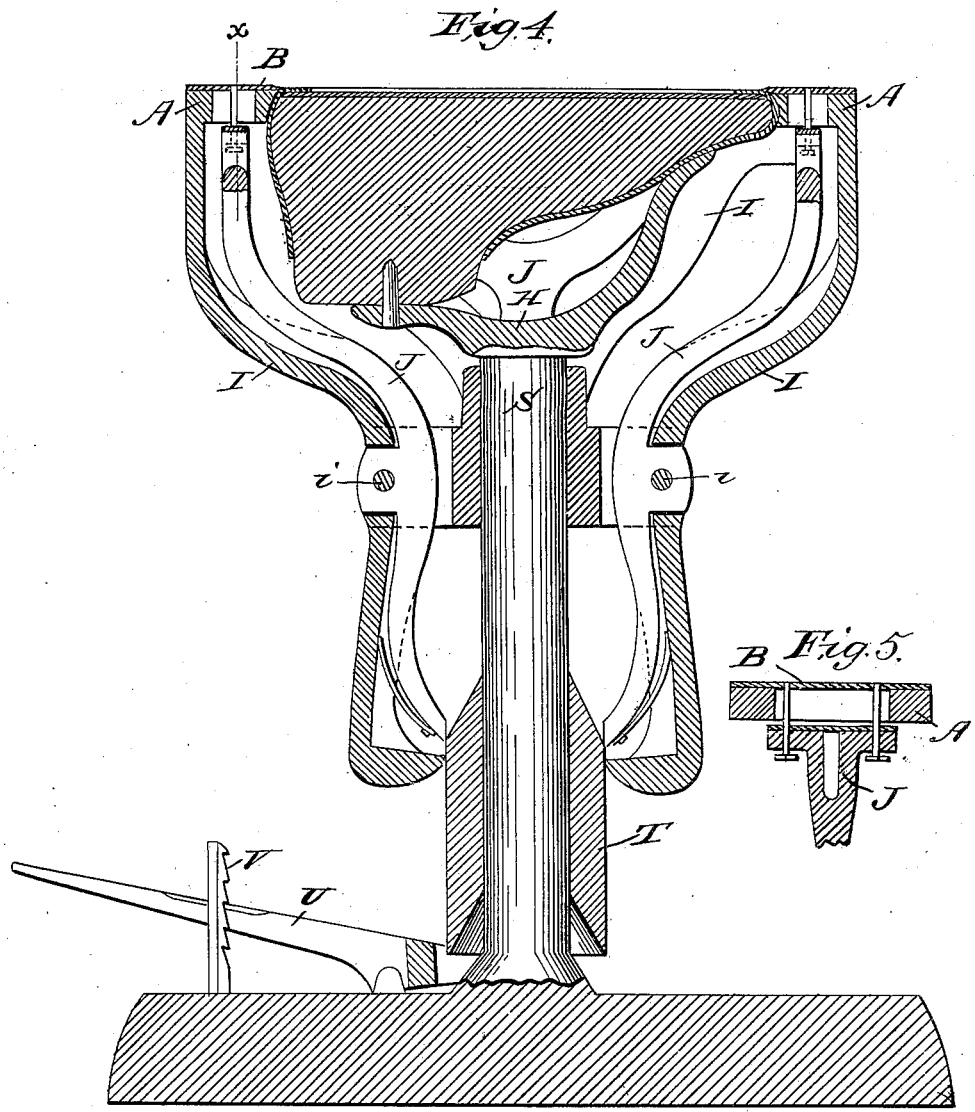

UNITED STATES PATENT OFFICE.

J. PURINTON, JR., OF LYNN, MASSACHUSETTS.

MACHINE FOR LASTING BOOTS AND SHOES.

Specification forming part of Letters Patent No. 25,673, dated October 4, 1859; Reissued January 6, 1863, No. 1,382.

*To all whom it may concern:*

Be it known that I, JAMES PURINTON, Jr., of Lynn, in the county of Essex and State of Massachusetts, have invented a Machine for Lasting Boots and Shoes; and I do declare that the same is fully described and represented in the following specification and the accompanying drawings, of which—

Figure 1, is a side and top elevation, with one jaw, or clamp, with its levers &c. removed. Fig. 2, is an opening and closing slide. Fig. 3, is a roughing or cutting slide.

In the drawings, A, A, A, A, represent the clamps, the purposes of which are, when carried forward and closed, to completely inclose the last and upper, and hold the upper firmly in its place, while the slides B, B, B, and C, carried forward and closed carry over, and press down on to the last, or inner sole, the projecting part of the upper D, D, D, there to be secured by means of cement, nails, pegs, or stitches. The ends of the slides B, B, B, and C, also the opening edges of slide C, may, or may not be sharpened, if sharpened it is for the purpose of cutting off what of the upper may be pressed between them while closing.

C, and Fig. 2 represent the opening, and closing slide, the purpose of which is to carry over the upper more smoothly, also to cut off a portion, as above described.

E, and Fig. 3, represent the roughing, or cutting slide, to be attached to slides B, B, B, and C so as to allow of a rocking motion, the purpose of said slide, being (when carried forward with slides B B B and C, for a given distance without touching the upper, then to be rocked or plunged down on or into the upper during the remaining part of the forward motion of the slides B B B and C, by means of the screws F, F, pressing down the springs G G,) to cut off or rough up the grain, or enamel of the upper, or to cut grooves in the same, so that the cement, by which the upper, and the outer sole may be united, will adhere more tenaciously to the upper. In short, what I intend to accomplish by this machine, and the manner, are as follows, viz first the upper is placed over and tacked upon the last. They are then placed upon the holder H, when the levers I, I, I I first close the clamps A A A A, then the levers J J J J close the slides B B B and C which carry over and press down the projecting upper D D D and hold it till secured, also carry forward slide E for its purpose.

I do not claim the clamps alone as merely holding the last and upper, such having been used, but What I do herein claim, is—

1. The clamps A, A, A, A in combination with the slides B B B and C and for the purposes herein specified, said clamps and slides, being carried to their place, by their levers I I I I and J J J J or their equivalents.

2. I also claim the opening and closing slide C and Fig. 2, also, the roughing or cutting slide D Fig. 3, for the purposes and as herein described.

JAMES PURINTON, JR.

Witnesses:
EDWIN WALDEN,
J. C. HOUGHTON.